Oct. 16, 1945.    C. E. BROWN    2,387,053
PINKING SHEARS
Filed July 20, 1943    2 Sheets-Sheet 1
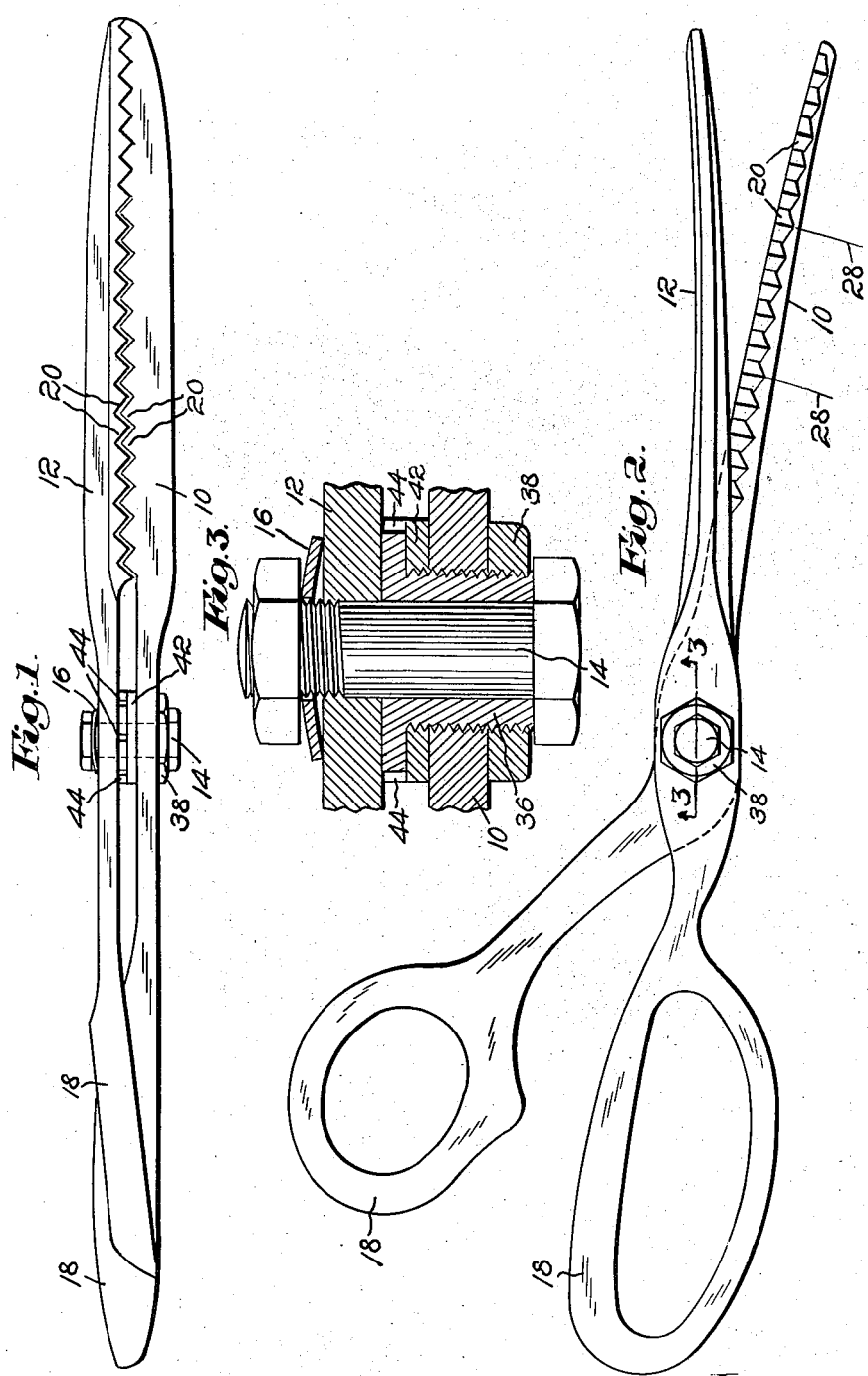
Inventor:
Clyde E. Brown, Oct. 16, 1945.  C. E. BROWN  2,387,053
PINKING SHEARS
Filed July 20, 1943  2 Sheets-Sheet 2
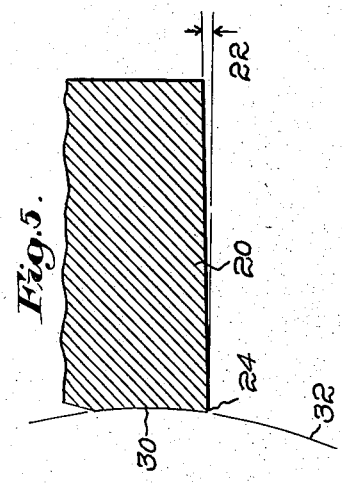
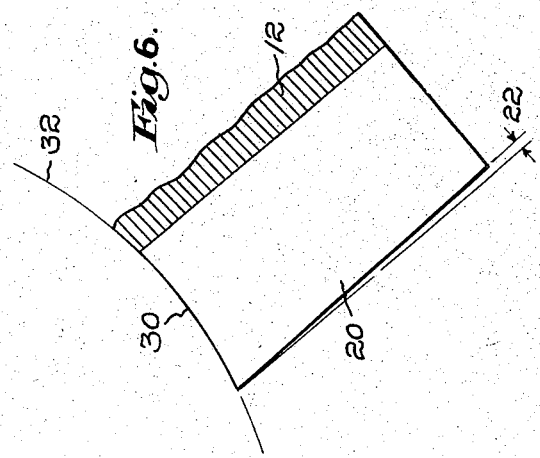
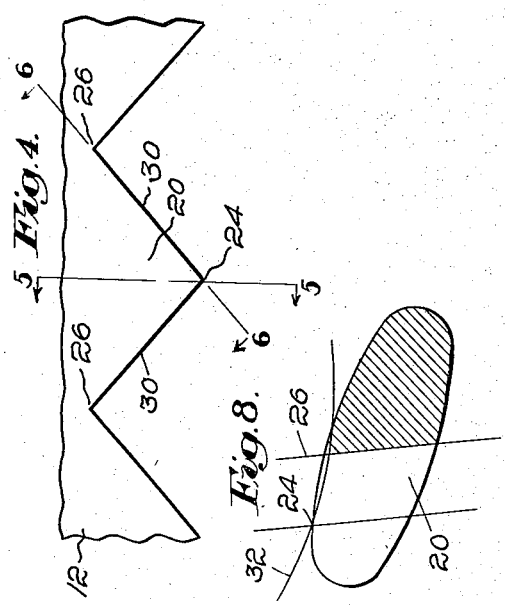
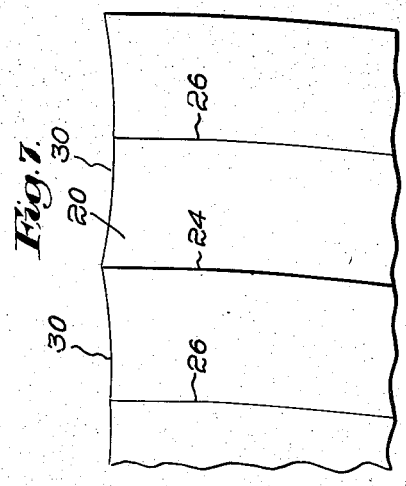
Inventor,
Clyde E. Brown,
by Emery, Booth, Townsend, Miller & Weidner
Attys Patented Oct. 16, 1945

2,387,053

UNITED STATES PATENT OFFICE 2,387,053

PINKING SHEARS

Clyde E. Brown, Grafton, Mass., assignor to Parker Manufacturing Company, Worcester, Mass., a corporation of Massachusetts Application July 20, 1943, Serial No. 495,463

4 Claims. (Cl. 30—230)

This invention relates to pinking shears, that is to say, a tool operable like ordinary hand shears or scissors but effective to cut a zigzag line, and the object is to provide a construction of shears particularly efficient in action while wieldy in the hand and neat to the eye. A marked advantage is provided by the preferred construction to be described in that the shears may readily be resharpened by the use of no greater equipment or skill than is possessed by the ordinary competent scissors grinder.

My invention will be well understood by reference to the following description of the illustrative embodiment thereof shown by way of example in the accompanying drawings, wherein:

Fig. 1 is a top plan view of the shears, the blades being closed;

Fig. 2 is a side elevation with the blades open;

Fig. 3 is a section on an enlarged scale taken on the line 3—3 of Fig. 2;

Fig. 4 is a view on a greatly enlarged scale in plan of a portion of the face of the nether blade showing certain of the teeth;

Figs. 5 and 6 are sections on the lines 5—5 and 6—6 of Fig. 4;

Fig. 7 is an elevation of Fig. 4 representing a view of a part of the inner surface of the blade, and Fig. 8 is a diagrammatic view and corresponds in part to a transverse section through one of the blades.

Referring to the drawings, the tool there shown comprises a pair of blade-forming levers, an upper lever 10 and a nether lever 12 pivoted together by a pivot bolt 14 which cooperates with the elastic cup washer 16, the levers extending at the rear of the pivot to provide the usual bows or handles 18. The handles are here shown as of the offset type; that is, as a whole they are at one side of the line along which the closed blades extend. In the following description in referring to these blade levers I shall term "inner surfaces" those which oppose each other when the shears are closed, Fig. 2 showing the inner surface of the further lever and the outer surface of the nearer lever. By "backs" I refer to those portions of the levers corresponding in location to the back of ordinary shear blades and by "faces" to the parts opposite to the backs and corresponding in location to the bevelled cutting edge of ordinary shear blades. Thus Fig. 1 shows the back of the blade 10 and the face of the nether blade 12.

While the invention in certain of its aspects may be otherwise embodied, the blade-forming portions of the levers 10 and 12 in the preferred form shown taper in cross section as they extend from the pivot, the sections having the general form of the major segment of an ellipse as hereinafter more fully described. The blades are so shaped that at least the faces thereof curve longitudinally outwardly from the pivot, as seen in Fig. 2, so that the angle between the faces as the shears close remains substantially constant and the teeth hereinafter described, the edges of which are the actual cutting elements, are successively presented to the work in substantially the same relation. Also, as seen in Fig. 1, the blade-forming portions are transversely bowed or curved, as is usual in shears, so that when completely closed, as seen in Fig. 1, there is a slight clearance between them at their proximal ends. In cutting, the point of contact of the blades travels from the proximal ends near the pivot out toward the distal ends as the cut proceeds, the blades flexing slightly to assume the position shown in Fig. 1 when completely closed.

The inner surfaces of the levers are formed with teeth 20 which when viewed in elevation, as in the case of the teeth of the nether blade 12 in Fig. 2 or in Fig. 7, are as a whole curved about the pivot 14 as a center, as indicated in Fig. 2 by arcs 28 struck along the crests of certain of the teeth. The teeth of one lever enter between those on the other, as seen in Fig. 1, to provide opposed cutting or shearing edges which cut a zigzag line. The teeth extend as ridges across the inner surfaces of the blades and have the form best seen in Figs. 4 through 7. Their portions which lie on the faces of the blades, as seen in plan in Fig. 4, and which correspond to the line of cut which they make are isosceles triangles and successive sections of each tooth in planes parallel to its face from the face toward the back of the blade are triangles having the same vertex angle but of progressively smaller altitude so that the flanks of the teeth incline outwardly and toward the back of the blade, thus providing clearance angles as indicated at 22 in Figs. 5 and 6. Roughly it might be said that the teeth approximately truncated triangular pyramids with one face (where they are joined to the body of the blade) substantially perpendicular to the base. This description is useful to give a general idea of the form of the teeth but it is, of course, not strictly accurate as the crest lines 24 and root lines 26 of the teeth, and of course corresponding lines along the flanks, are arcs centered on the pivotal axis, as is indicated for certain of the teeth by the arcs 28 drawn in Fig. 2. In effect a tooth is a segment of a torus (solid of revolution) generated by the revolution of an isosceles triangle which has its altitude parallel to the pivotal axis of the blades, the revolution taking place about a point in the pivotal axis but in a plane oblique to such axis.

The teeth make shearing contact with each other along the surfaces 30 where the tooth has its maximum cross-sectional area and the edges are sharpened by grinding the faces of the levers to suitable cylindrical contour, as best shown by the arcs 32 in Figs. 5 and 6, so that these faces are concave from the crests 24 of the teeth outwardly. As a result the edges 30 are curved, as best seen in Fig. 7. As the shears close each opposed pair of shearing edges of a cooperating pair of teeth first meet at the root of one, close toward its crest diagonally of the general direction in which the shears are pointing, and then along the opposite side of the tooth from the crest diagonally in the opposite direction to the root, thus forming one undulation of the zigzag cut. Because of the curvature of the edges as described a substantially constant angle of closure of the cooperating edges is provided throughout these individual shearing actions and this gives a particularly easy and effective cut, particularly when the blade faces as a whole are curved as above described and as illustrated in Fig. 2, in such manner that the successive teeth approach the plane of the work at substantially the same angle.

As I have previously stated, the preferred section for the blades is that of a major segment of an ellipse or oval although that word is to be understood in a general descriptive sense rather than in its strict mathematical sense. In Fig. 8 I have shown the outline of such an ellipse or oval with its major axis indicated. As seen from Fig. 8, the major axis is disposed at an inclination to the pivot line, which would be horizontal in Fig. 8. At one extremity of the major axis, corresponding to the inner surface of the blade lever, the ellipse is cut away along the lines 24 and 26, providing the teeth 20, and it is ground along the arc 32 to provide the cutting edges at the face of the teeth. It may be desirable to state parenthetically at this point that the showing of the complete outline of an ellipse in Fig. 8 is not intended to imply that the section of the physical blank for the blade lever would necessarily or usually be a complete ellipse. In action as the teeth pass each other, the major axes of the two levers are parallel and in one position of the parts, as the blades cross each other, are in alignment. Considered as a whole, the teeth do not pass out of "mesh" but remain in substantial degree interdigitated, although after the cutting edges pass one another there is no subsequent contact between opposed teeth. Blades constructed in this manner are strong yet light and are very easily manipulated. With the tapered teeth already described the cloth readily clears itself from the blades in the cutting action.

The blades as described may be sharpened by grinding the faces of the levers along the surface indicated by the line 32 in Fig. 5 by means of a suitable rotating wheel. The removal of stock by such a sharpening operation exposes a portion of the tooth of smaller section and thus opens up a space between the cutting edges of the teeth of the companion blades. I therefore provide a construction whereby this clearance may be taken up. For this purpose the blade levers 10 and 12, instead of lying flatwise one against another in the manner of ordinary shears, are provided at the pivotal point with a mutual bearing of restricted area, the effective height of which may be altered to control the operative shearing engagement of the cutting edges of the teeth.

One suitable construction for this bearing is shown in Fig. 3 wherein the upper blade 10 is threaded to receive a sleeve 38 secured by locking nut 38 through which sleeve the pivot bolt 14 extends. The sleeve has a flange 40 which provides an elevated bearing for the nether blade 12 and is supported by a compressible member or washer 42 interposed between the flange and the inner surface of the blade 10. In referring to this member as "compressible" I do not mean that it is compressible easily like soft rubber but a suitable grade of firm or hard rubber (not hard rubber in the sense of ebonite), compressed cork or fiber provide materials which will support the flange 40 in a constant position during normal use yet which is capable of the necessary slight compression under the stress of the thread of the sleeve when it is desired to adjust the same. The flange 40 is preferably provided with peripheral notches 44 for engagement by a suitable tool to permit the turning movement of the sleeve required for this adjustment.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. Pinking shears comprising a pair of interpivoted blade levers having interdigitated teeth on the inner surfaces, the flanks of the teeth inclining from cutting edges at the faces of the levers outwardly and toward the backs, one of the levers carrying a flanged sleeve encircling the pivot, the outer surface of the flange providing a bearing for the companion lever, a compressible element underlying the flange, and means for adjusting the sleeve against said element.

2. Pinking shears comprising a pair of interpivoted blade levers having interdigitated teeth on the inner surfaces, the flanks of the teeth inclining from cutting edges at the faces of the levers toward the backs of their respective levers and away from the face of the opposed lever, the faces of the levers curving outwardly from the pivot in a plane perpendicular to the pivotal axis and being concaved transversely from the points of the teeth to the outer side.

3. Pinking shears comprising a pair of interpivoted blade levers which curve longitudinally outwardly from the pivot and sections of which are substantially major segments of ellipses with their major axes inclined to the pivot axis and cut away at the inner extremities of such axes to provide interdigitated teeth, the flanks of which incline from their cutting edges at the faces of the levers toward the backs of their respective levers and away from the face of the opposed lever.

4. Pinking shears comprising a pair of interpivoted levers, the inner surfaces of which present one to another alternating teeth successive cross sections of which from the face toward the back are essentially triangles of the same vertex angle but of diminishing altitude, the faces of the levers being concaved from the vertex of the teeth outwardly whereby a substantially constant angle of closure of cooperating edges of successive teeth is provided.

CLYDE E. BROWN.